United States Patent
Chen

(10) Patent No.: US 7,547,989 B2
(45) Date of Patent: Jun. 16, 2009

(54) CONTROL ARCHITECTURE FOR POWER SUPPLY

(75) Inventor: Tsung-Chun Chen, Taipei Hsien (TW)

(73) Assignee: Zippy Technology Corp., Taipei Hsien (TW)

( * ) Notice: Subject to any disclaimer, the term of this patent is extended or adjusted under 35 U.S.C. 154(b) by 0 days.

(21) Appl. No.: 11/540,661

(22) Filed: Oct. 2, 2006

(65) Prior Publication Data

US 2008/0079317 A1    Apr. 3, 2008

(51) Int. Cl.
*H02J 1/10* (2006.01)
(52) U.S. Cl. .......................................... 307/43; 307/115
(58) Field of Classification Search ................ 307/43, 307/112, 115; 713/300
See application file for complete search history.

(56) References Cited

U.S. PATENT DOCUMENTS

2005/0005177 A1 * 1/2005 Han ........................... 713/300
2006/0031688 A1 * 2/2006 Chou ......................... 713/300

* cited by examiner

*Primary Examiner*—Albert W Paladini
*Assistant Examiner*—Carlos Amaya
(74) *Attorney, Agent, or Firm*—Muncy, Geissler, Olds & Lowe, PLLC

(57) ABSTRACT

The present invention discloses a control structure for a power supply, which comprises: a primary power system, a power switching unit, and at least one switch. The primary power system transforms an external source power into DC powers. The power switching unit is normally electrically connected with the primary power system and normally driven by a DC power output by the primary power system. The switch is installed on a DC power cable supplying DC power to an internal electronic device. Thereby, when the computer is turned off, the present invention will not be affected but can still provide DC powers to external electronic devices. Further, even though the computer is turned off, the present invention can still provide the external electronic devices with the maximum power (when only the primary power system is installed) or the total power (when the primary power system is connected in parallel with a regular power system).

4 Claims, 4 Drawing Sheets

CONTROL ARCHITECTURE FOR POWER SUPPLY

FIELD OF THE INVENTION

The present invention relates to a power supply, particularly to a design, which can still output the maximum DC power to external electronic devices even though the computer has been turned off.

BACKGROUND OF THE INVENTION

The power supply installed inside a computer is to transform AC power into stable and different voltage level DC powers for the devices inside the computer, such as the mother board, hard drives, and optical drives. In the earlier stage, the power supply cannot provide power for the devices inside the computer unless the computer is turned on.

In the currently prevailing design of the ATX standard, besides the DC powers (3.3V, 5V, 12V, etc.) provided when the computer is turned on, there is also a regular power which can supply power no matter whether the computer is turned on or turned off.

Besides the operating system and application programs, many external electronic devices are also used in the present application environment of computers, including: speakers, night lamps, the CD drives capable of replaying music directly, USB charging devices for PDA or mobile phones, the minor LCD on the computer casing for presenting time, temperature, humidity, etc., and the gorgeous light-emitting computer casing. All the abovementioned external electronic devices can operate independently without the operating system. However, in many present designs, power supplies cannot supply power unless the computer is turned on. Alternatively, a regular power system is installed in a power supply to provide DC power when the computer is turned off. However, the wattage output by a regular power system is smaller, and the number of voltage levels is insufficient. Therefore, the conventional regular power system is unlikely to supply sufficient power for a high-power external electronic device.

SUMMARY OF THE INVENTION

The primary objective of the present invention is to provide a control structure for a power supply, whereby the power supply still outputs DC powers to electronic devices after the computer has been turned off; even though the computer has been turned off, the DC power supplied to external electronic devices can still output the maximum power of the power supply when there is only a primary power system or the total power of the primary power system and a regular power system when the primary power system and the regular power system are connected in parallel.

To achieve the abovementioned objective, the present invention proposes a control structure for a power supply, which comprises: a primary power system, a power switching unit, and at least one switch. The primary power system transforms an external source power into DC powers. The power switching unit is normally electrically connected to the primary power system and is normally driven by the DC power of the primary power system. The power switching unit outputs a computer-turn on signal and a computer-turn off signal. The switch is electrically connected to the power switching unit and is installed on the power cable used to provide DC power for an internal electronic device. When the switch receives a computer-turn on signal, the switch will be in the closed-circuit state, and DC power will be transmitted to the internal electronic device. When the switch receives a computer-turn off signal, the switch will be in the open-circuit state, and DC power will not be transmitted to the internal electronic device. Thereby, when the computer is turned off, the present invention will not be affected by computer turn-off but can still provide DC powers to external electronic devices. Further, even though the computer is turned off, the externally-connected terminals can still provide the maximum DC power or the total DC power of the power supply.

DETAILED DESCRIPTION OF THE PREFERRED EMBODIMENTS

The technical contents of the present invention are to be described in detail in cooperation with the drawings below.

Figure 1:
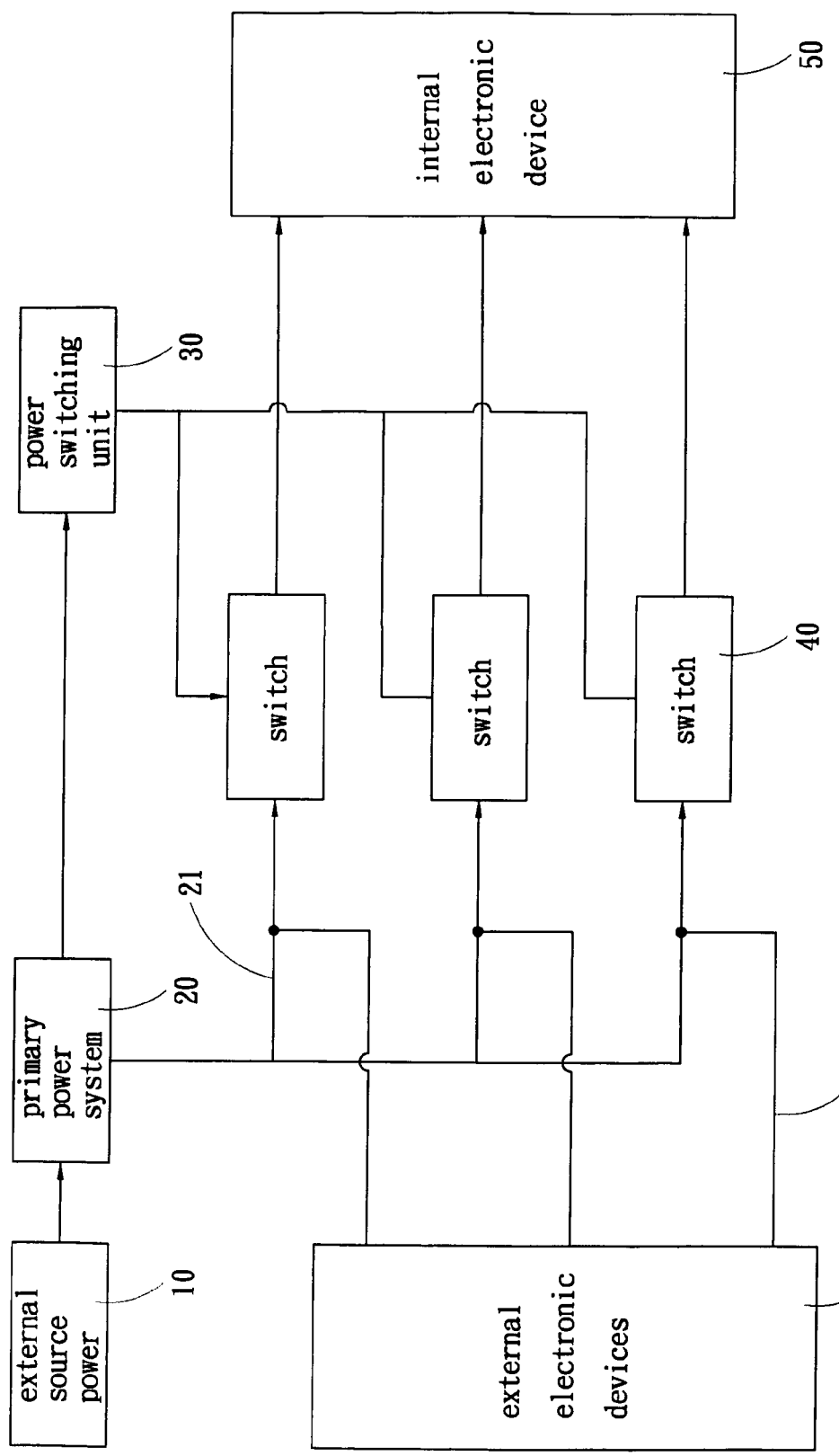
FIG. 1 is a block diagram showing the control structure according to a first preferred embodiment of the present invention.
Figure 2:
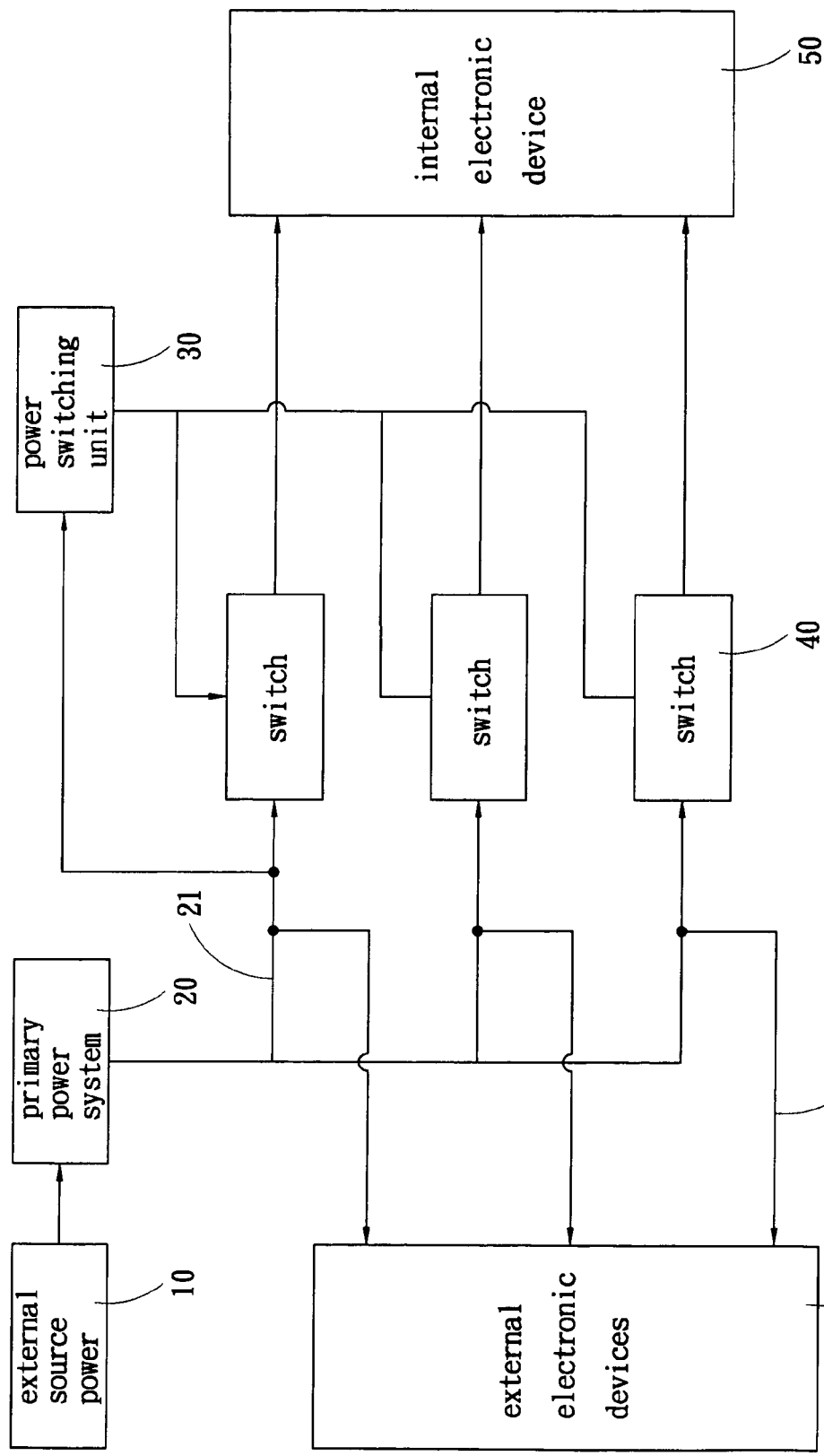
FIG. 2 is a block diagram showing the control structure according to a second preferred embodiment of the present invention.

Refer to FIG. 1 a block diagram showing the control architecture according to a first preferred embodiment of the present invention. As shown in FIG. 1, the control structure for a power supply of the present invention is connected to an external source power 10 and transforms the external source power 10 into different voltage-level DC powers to drive internal electronic devices 50 of a computer. The control structure for a power supply of the present invention comprises: a primary power system 20, a power switching unit 30 and at least one switch 40. The primary power system 20 transforms the external source power 10 into DC powers. The power switching unit 30 is normally electrically connected to the primary power system 20 and is normally driven by one DC power of the primary power system 20. The power switching unit 30 outputs a computer-turn on signal and a computer-turn off signal. The power switching unit 30 is electrically connected to a DC power cable 21 of the primary power system 20. Otherwise, the power switching unit 30 and one internal electronic device 50 may be connected in parallel to jointly use a DC power cable 21, as shown in FIG. 2 a block diagram showing the control architecture according to a second preferred embodiment of the present invention. The switch 40 is electrically connected to the power switching unit 30 and is installed on the DC power cable 21 used to provide DC power for the internal electronic device 50. When the switch 40 receives the computer-turn on signal, the switch 40 will be in the closed-circuit state, and DC power will be transmitted to the corresponding internal electronic device 50. When the switch 40 receives the computer-turn off signal, the switch 40 will be in the open-circuit state, and DC power will not be transmitted to the corresponding internal electronic device 50. An external electronic device 60 is connected in parallel with the internal electronic device 50 via a regular-power cable 22 beginning from one point of the DC power cable 21 between the primary power system 20 and the corresponding switch 40. Thereby, driving power is normally ready for the external electronic device 60. Thus, the primary power system 20 will not be affected by computer turn-off but can still provide DC powers to the external electronic devices 60. Further, even though the computer is turned off, the primary power system 20 can still provide the maximum DC power.

Figure 3:
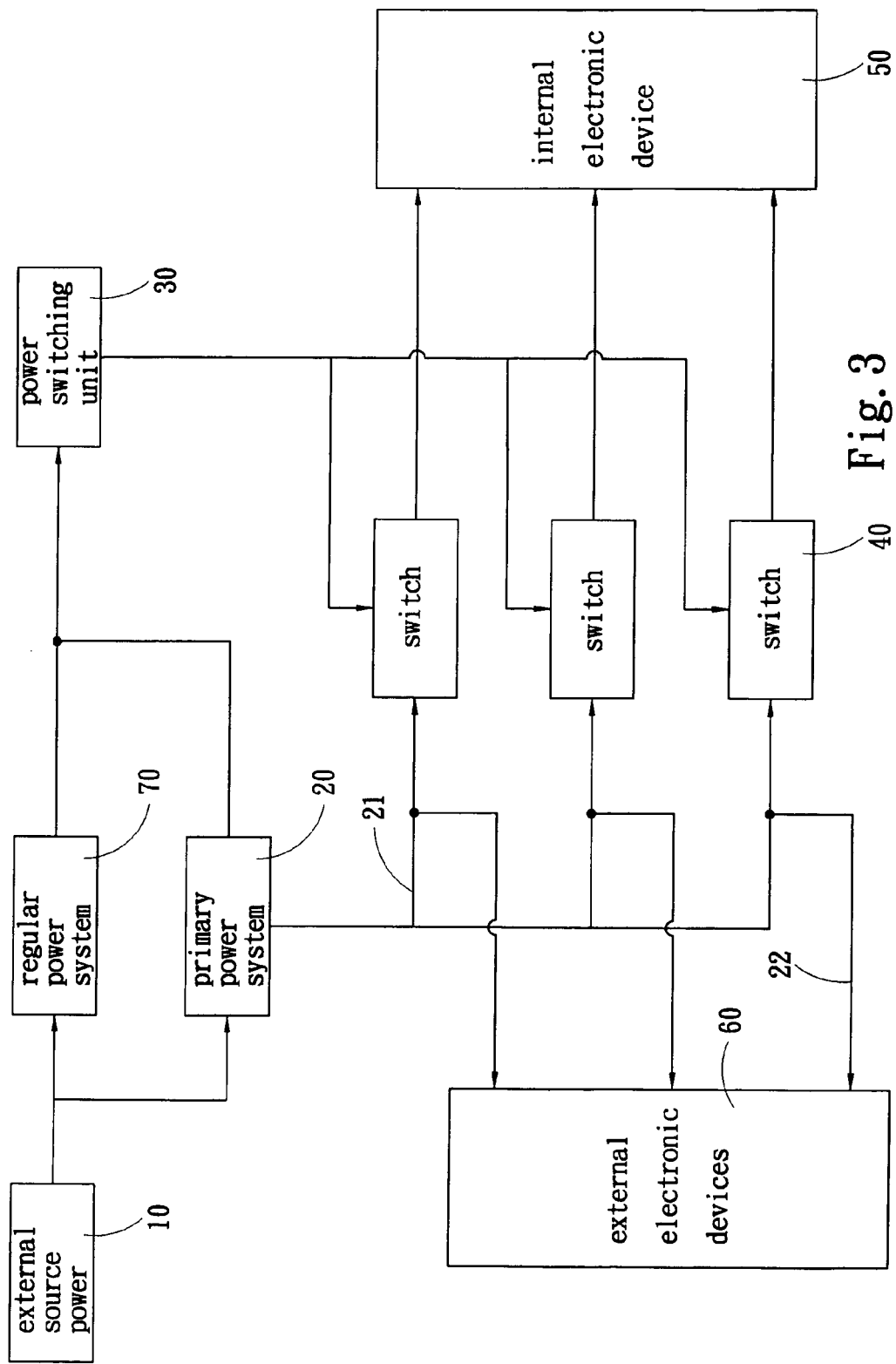
FIG. 3 is a block diagram showing the control structure according to a third preferred embodiment of the present invention.
Figure 4:
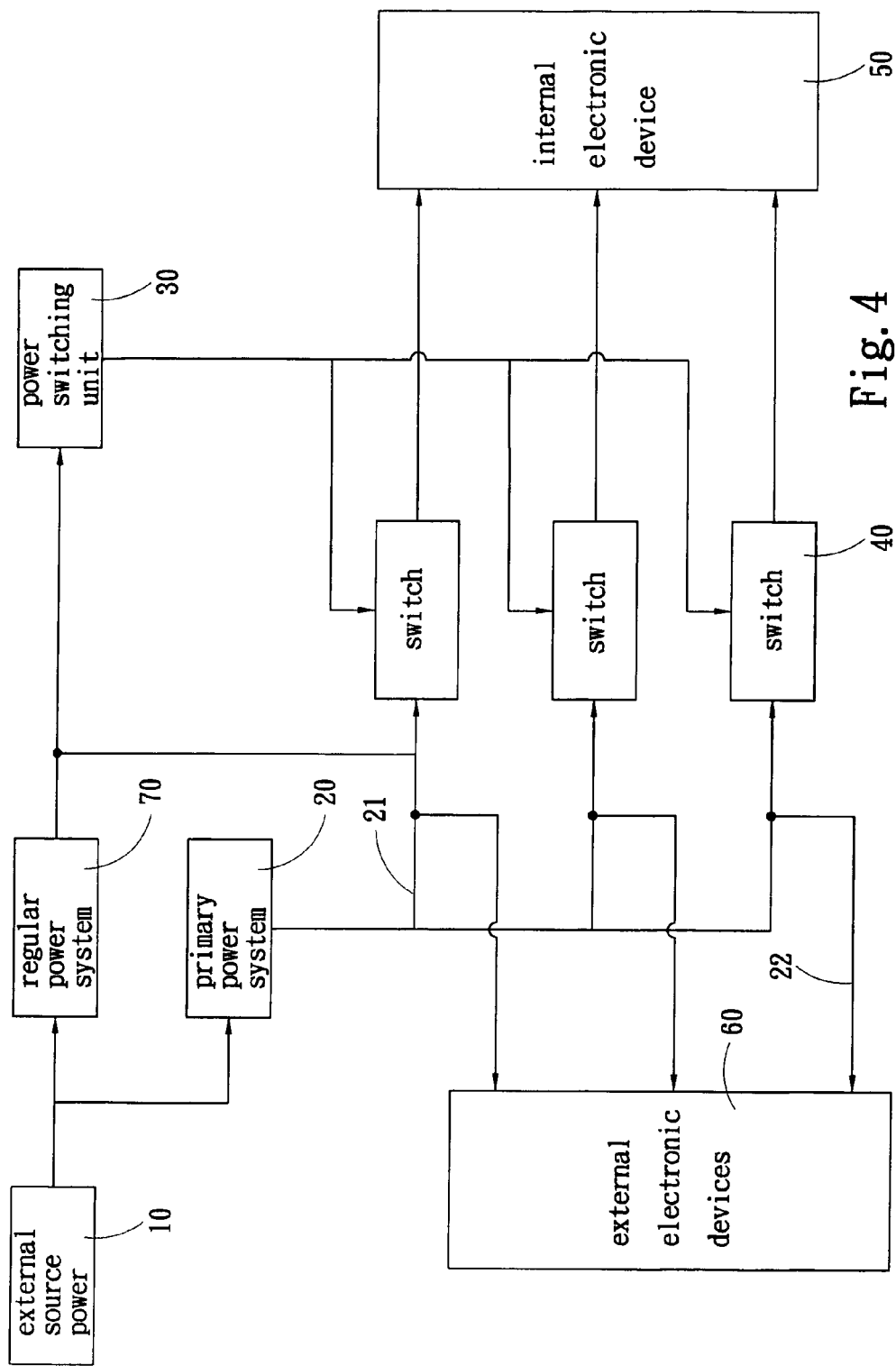
FIG. 4 is a block diagram showing the control structure according to a fourth preferred embodiment of the present invention.

Refer to FIG. 3 a block diagram showing the control architecture according to a third preferred embodiment of the present invention. In this embodiment, the structure of the present invention comprises: a primary power system 20 and a regular power system 70. The primary power system 20 is normally electrically connected to an external source power 10 and transforms the external source power 10 into DC powers. The regular power system 70 outputs DC power to drive a power switching unit 30, and the power switching unit 30 outputs a computer-turn on signal and a computer-turn off signal. The primary power system 20 and the regular power system 70 are connected to the external source power 10 in parallel and transform the source power 10 into DC powers. At least one DC power of the primary power system 20 drives the power switching unit 30 in parallel with the DC power of the regular power system 70. A switch 40 is installed on each of DC power cables 21 via which the power switching unit 30 drives internal electronic devices 50. When one switch 40 receives the computer-turn on signal, the switch 40 will be in the closed-circuit state, and DC power will be transmitted to the corresponding internal electronic device 50. When the switch 40 receives a computer-turn off signal, the switch 40 will be in the open-circuit state, and DC power will not be transmitted to the corresponding internal electronic device 50. An external electronic device 60 is connected in parallel with the internal electronic device 50 via a regular-power cable 22 beginning from one point of the DC power cable 21 between the primary power system 20 and the corresponding switch 40. Thereby, driving power is normally ready for the external electronic device 60. Thereby, driving power is normally ready for the external electronic devices 60. Refer to FIG. 4 a block diagram showing the control structure according to a fourth preferred embodiment of the present invention. In this embodiment, a regular-power cable 22 is connected in parallel with the DC power cable 21 which is connected with the primary power system 20 in parallel to drive the power switching unit 30, and the regular power cable 22 is also connected to the external electronic device 60. Thereby, driving power is normally ready for the external electronic devices 60. When the computer is turned off, the total DC power supplied to the external electronic devices 60 amounts to the sum of the power supplied by the primary power system 20 and the power supplied by the regular power system 70.

Those described above are the preferred embodiments to exemplify the present invention. However, it is not intended to limit the scope of the present invention. Any equivalent modification and variation according to the spirit of the present invention is to be also included within the scope of the present invention.

What is claimed is:

1. A control structure for a power supply, used to transform an external source power into different voltage level DC powers for internal electronic devices of a computer, and comprising:

a primary power system, transforming said external source power into DC powers;

a power switching unit, normally electrically connected with said primary power system, normally driven by a DC power output by said primary power system, and outputting a computer-turn on signal and a computer-turn off signal;

at least one switch, installed on a DC power cable supplying DC power to said internal electronic device, and electrically connected to said power switching unit, wherein when said switch receives said computer-turn on signal, said switch will be in the closed-circuit state, and DC power will be transmitted to said internal electronic device; when said switch received said computer-turn off signal, said switch will be in the open-circuit state, and DC power will not be transmitted to said internal electronic device; and an external electronic device is connected in parallel with said internal electronic device with a regular power cable beginning from one point of said DC power cable between said primary power system and the corresponding said switch; thereby, driving power is normally ready for said external electronic device.

2. The control structure for the power supply according to claim 1, wherein said power switching unit and one of one said electronic devices is connected in parallel to jointly use one DC power cable.

3. A control structure for a power supply, used to transform an external source power into different voltage level DC powers for internal electronic devices of a computer, and comprising:

a regular power system, normally electrically connected to said external source power, transforming said external source power into DC powers to drive a power switching unit, wherein said power switching unit outputs a computer-turn on signal and a computer-turn off signal;

a primary power system, connected to said external source power in parallel together with said regular power system, transforming said external source power into DC powers, wherein at least one DC power output by said primary power system is used to drive said power switching unit in parallel; each DC power cable, via which said power switching unit drives said internal electronic device, has a switch; when said switch receives said computer-turn on signal, said switch will be in the closed-circuit state, and DC power will be transmitted to said internal electronic device; when said switch receives said computer-turn off signal, said switch will be in the open-circuit state, and DC power will not be transmitted to said internal electronic device; and an external electronic device is connected in parallel with said internal electronic device via the regular-power cable beginning from one point of said DC power cable between said primary power system and the corresponding said switch; thereby, driving power is normally ready for said external electronic device.

4. The control structure for the power supply according to claim 3, wherein a regular power cable is connected in parallel with said DC power cable, which is parallel connected to said primary power system to drive said power switching unit, and said regular power cable is also connected to an external electronic device; thereby, driving power is normally ready for said external electronic device.

* * * * *